US011790390B2

(12) United States Patent
Harris

(10) Patent No.: US 11,790,390 B2
(45) Date of Patent: Oct. 17, 2023

(54) METHODS AND SYSTEMS FOR REDEEMING POINTS FOR RECOMMENDED AWARDS

(71) Applicant: The Board of Regents of the Nevada System of Higher Education on Behalf of the University of Nevada, Las Vegas, Las Vegas, NV (US)

(72) Inventor: Becky Kay Harris, Las Vegas, NV (US)

( * ) Notice: Subject to any disclaimer, the term of this patent is extended or adjusted under 35 U.S.C. 154(b) by 0 days.

(21) Appl. No.: 15/926,817

(22) Filed: Mar. 20, 2018

(65) Prior Publication Data

US 2018/0268431 A1 Sep. 20, 2018

Related U.S. Application Data

(60) Provisional application No. 62/473,632, filed on Mar. 20, 2017.

(51) Int. Cl.
*G06Q 30/0226* (2023.01)
*G06Q 30/0207* (2023.01)
*G06N 5/04* (2023.01)
*G06N 3/084* (2023.01)

(52) U.S. Cl.
CPC ......... *G06Q 30/0233* (2013.01); *G06N 3/084* (2013.01); *G06N 5/04* (2013.01); *G06Q 30/0212* (2013.01)

(58) Field of Classification Search
CPC .................................................... G06Q 30/02
See application file for complete search history.

(56) References Cited

U.S. PATENT DOCUMENTS

| | | | | |
|---|---|---|---|---|
| 2008/0262925 | A1* | 10/2008 | Kim ...................... | G06N 20/00 705/14.27 |
| 2012/0046991 | A1* | 2/2012 | Bai ........................ | G06Q 30/02 705/7.29 |
| 2012/0290468 | A1* | 11/2012 | Benco ................ | G06Q 20/3224 705/39 |
| 2016/0066140 | A1* | 3/2016 | Gnanasekaran ... | G06Q 30/0207 455/456.3 |

(Continued)

OTHER PUBLICATIONS

Seaborn, Katie & Deborah Fels. "Gamification in theory and action: a survey" International Journal of Human-Computer Studies, vol. 74, 2015, pp. 14-31. https://doi.org/10.1016/j.ijhcs.2014.09.006. (https://www.sciencedirect.com/science/article/pii/S1071581914001256) (Year: 2015).*

(Continued)

*Primary Examiner* — Katherine Kolosowski-Gager
(74) *Attorney, Agent, or Firm* — Ballard Spahr LLP

(57) ABSTRACT

Systems and methods are described for receiving behavior data associated with a plurality of users, generating a predictive model, receiving location data associated with the plurality of users, receiving service provider utilization data, determining, based on the predictive model, the location data, and the service provider utilization data, one or more recommended awards, transmitting to a subset of the plurality of users an offer to exchange a number of points to enter a drawing to win the one or more recommended awards, and receiving one or more requests to enter the drawing to win the one or more recommended awards in exchange for points.

20 Claims, 7 Drawing Sheets

(56) References Cited

U.S. PATENT DOCUMENTS

2017/0186027 A1\* 6/2017 Hudson .............. G06Q 30/0222
2018/0165704 A1\* 6/2018 Mullen .............. G06Q 30/0233

OTHER PUBLICATIONS

Matyszczyk, C., Airlines' Latest Sneaky Trick: Charging Passengers According to Who They Are, Not Where They're Flying. Inc. Feb. 25, 2018. Retrieved from the Internet on Aug. 2, 2018. Retrieved from: < https://www.msn.com/en-us/travel/news/airlines-latest-sneaky-trick-charging-passengers-according-to-who-they-are-not-where-theyre-flying/ar-BBJBmzB?li=BBgzzfc&%3Bocid=edgsp> (4 pages).

\* cited by examiner

METHODS AND SYSTEMS FOR REDEEMING POINTS FOR RECOMMENDED AWARDS

CROSS REFERENCE TO RELATED PATENT APPLICATION

This application claims the benefit of the filing date of U.S. Provisional Patent Application No. 62/473,632, filed on Mar. 20, 2017, which is incorporated by reference herein in its entirety.

BACKGROUND

Loyalty programs are popular among companies across a wide-range of industries, such as gas stations, grocery chains, airlines, movie theaters, gaming establishments—the list is nearly endless as loyalty programs become more and more ubiquitous. A recent study by a leading consultancy found that approximately 77% of U.S. consumers participate in a loyalty program, nearly 46% of U.S. consumers participate in a hotel chain loyalty program, and about 40% of U.S. consumers participate in an airline loyalty program. This figure is an increase from 72%, 36%, and 31%, respectively, just one year ago. Though specific programs vary from company to company, one commonality shared among all programs is the accrual of points in some form or another. These points may be tied to dollars spent at a company's place of business, miles flown on an airline, tickets purchased within a given timeframe, and so on. For customers and guests, the benefit of participating in a loyalty program is being able to redeem the points for rewards, discounts, etc., offered by the company hosting the loyalty program. Therefore, unredeemed points are a liability on the hosting company's balance sheet. Recent studies have shown that there are nearly $100 billion in unredeemed loyalty points in the U.S. and Canadian consumer markets. A company may interpret a high level of unredeemed points as general customer or guest dissatisfaction with the company's loyalty program, since other studies have shown that customers or guests who regularly redeem their loyalty points are twice as likely to be highly satisfied with the respective loyalty points program than those who do not regularly redeem points.

Customers and guests may refrain from redeeming points for a variety of reasons. For example, they may be disengaged from a program because they are simply unaware of their points balance and/or redemption rules and opportunities. One study has shown that upwards of 57% of loyalty program members do not know their points balance, and almost 38% are unaware of how their points translate into monetary value in terms of rewards. Additionally, some customers and guests are more strategic in accumulating and redeeming their points. As an example, a customer of a grocery chain may refrain from frequently redeeming points because they keep the points as a "rainy day fund" to be used in the event they are unable, for one reason or another, to purchase a good that can also be redeemed with points. As another example, a customer of an airline may bank their points over a long period of time in order to save towards a reward that requires a large number of points, such as free or discounted international travel. Regardless of why a customer or guest may not regularly redeem their points, it is in the best interest of companies to encourage their customers and guests to frequently do so, as it lowers outstanding liabilities and simultaneously increases brand loyalty and goodwill. As the studies and statistics mentioned above show, loyalty programs currently in use are not engaging customers and guests as effectively as companies would like. Therefore, a need exists for a loyalty program that keeps customers and guests engaged and encourages them to frequently redeem their points. These and other shortcomings are addressed by the methods and systems described herein.

SUMMARY

It is to be understood that both the following general description and the following detailed description are exemplary and explanatory only and are not restrictive. Systems and methods are described for receiving behavior and location data associated with a plurality of users, which is used to generate a predictive model for each user. Utilization data for one or more service providers is received from a database, and an offer to enter a drawing to win one or more goods or services from the one or more service providers is sent to a subset of users among the plurality of users. A user who receives the offer can request to enter the drawing by exchanging a predetermined number of "points" in their respective points balance, and the requests are in turn received from the one or more users who wish to enter the drawing. Additionally, instead of being required to enter a drawing, one or more users may receive an offer to directly swap a certain number of points in exchange for one or more goods or services.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
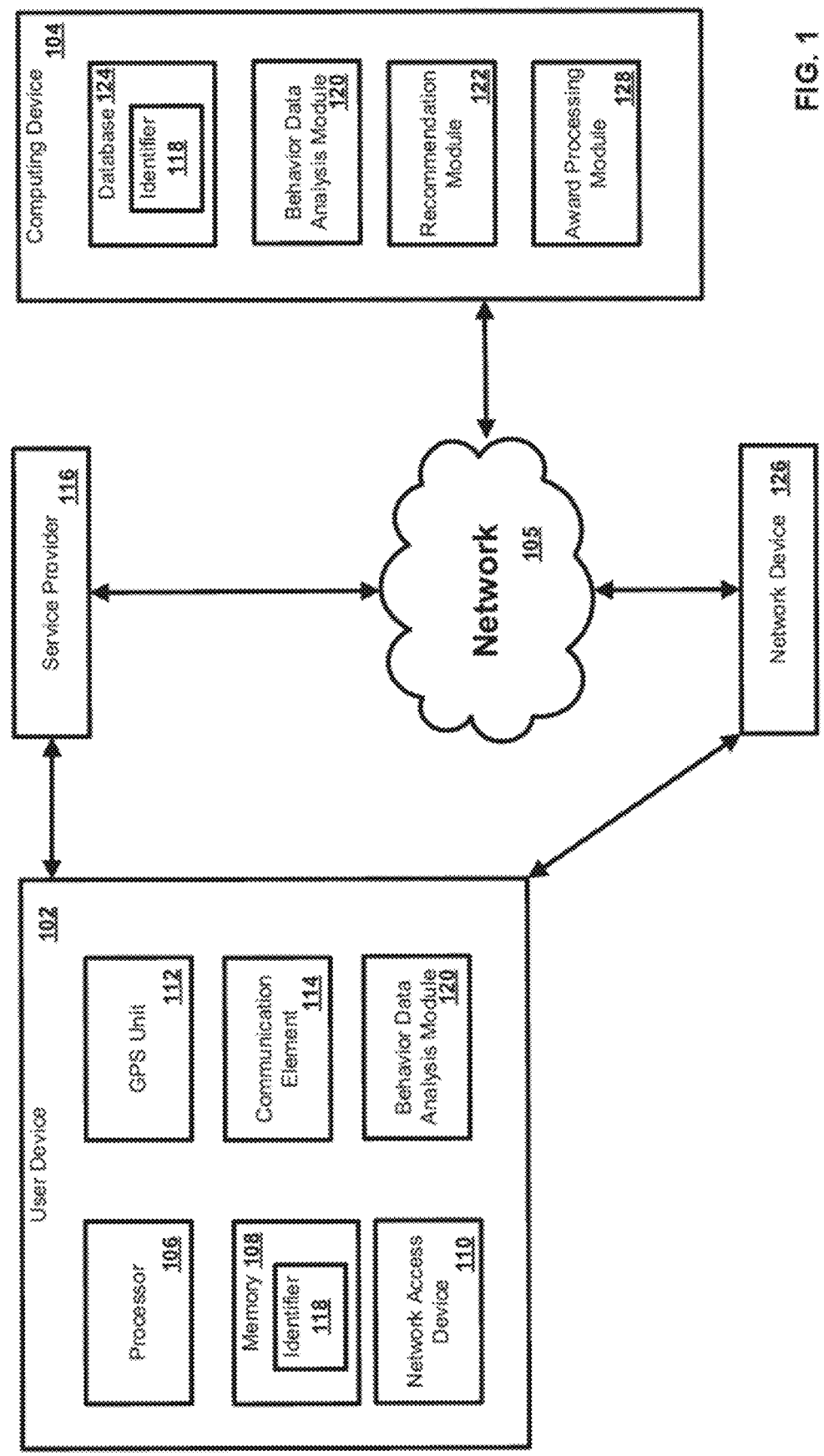
FIG. 1 is a block diagram of an exemplary system.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not. Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc., of these components are disclosed that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description. As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software, such as, for example, a mobile device application in communication with an application server. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus, such as a mobile device and/or an application server, to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus, such as a mobile device or an application server, to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present disclosure relates to methods and systems for providing users an opportunity to exchange points accumulated through a loyalty program for a chance to win free or discounted goods or services from a service provider. Loyalty programs are popular among various industries. Most loyalty programs have a similar operating strategy—reward consumers who purchase a company's goods or services by providing points to the consumers that can be exchanged for one or more awards. Example awards include free items and/or discounted items (e.g., a retailer's merchandise, an airline ticket, a movie ticket, a ticket to see a play or opera, restaurant items, discount coupons, and the like). Further, example rewards can include free or discounted rounds of play at a gaming establishment (e.g., a casino having multiple game tables, slot machines, etc.). Loyalty programs provide for companies, among other things, increased brand loyalty by encouraging consumers to continually purchase from the company in order to accumulate more points.

A loyalty program implementing the disclosed methods and systems can allow points to be exchanged by a user for a chance to win an award (e.g., complimentary hotel rooms, rounds of play at a casino, airline travel, restaurant gift cards, apparel from a retailer, etc.), a discount (e.g., discounted hotel rooms, buy-one-get-one free rounds of play at a casino, discounted airline travel, restaurant discounts, discounted merchandise from a retailer, etc.), and the like. In an aspect, the exchanged points are used to acquire a lottery or raffle-style ticket that is used when determining which user or users receives the award. In another aspect, the exchanged points can be used to play a game of chance, skill, or a skill/chance hybrid to attempt to win the award. In still another aspect, the exchanged points are directly exchanged for the reward without the need to enter a drawing, or to play a game, in an attempt to win the reward.

An application server can be used to track accumulations and exchanges of loyalty points for a plurality of users. The application server can also be used to create a user profile for each user of the plurality of users based on received user behavior and/or location data. The application server may also receive service provider utilization data, which may indicate one or more goods or services offered by a company that are currently underutilized (e.g., excess inventory, an abundance of available seating at a given time at a restaurant, small crowds at a gaming venue, an abundance of unsold tickets for a performance at a venue, etc.). Further, the application server can generate, based on the user profiles, a predictive model for each user, which may provide information indicative of one or more of a user's next purchase, a user's travel plans, and/or a user's future gaming activity. Using the predictive model for each user, the location data, and the service provider utilization data, the application server can recommended one or more awards for a subset of users among the plurality of users and transmit a message to mobile devices associated with the subset of users. The message, once received by the mobile devices, may cause a mobile device application installed thereon to automatically launch and display an offer to exchange a predetermined amount of loyalty points to enter a drawing to win the one or more awards. The users who receive the offer can accept the offer (e.g., via the mobile device application), and the acceptance can be received by the application server. In some examples, the application server may set a fixed amount of time for users to respond (e.g., users must accept, ignore, or reject the offer within 10 minutes), and it may also require that a predetermined number of users must respond prior to choosing a winner(s). Determining which user or users who enter the drawing receives the reward depends upon, among other things, the behavior data associated with the plurality of users, the location data for each user of the plurality of users, and/or the service provider utilization data. Once a user or users is determined to be the winner (or winners), the application server may then deduct a number of points associated with the offer from each participating user's respective points balance (e.g., both winners and losers). The number of points required to enter the drawing can be individualized for each user of the plurality of users based on each user's respective user profile and predictive model. Additionally, or in the alternative, one or more users may receive an offer to exchange points for the one or more recommended awards without entering a drawing (e.g., a direct swap of points for a gift certificate, discount, etc.).

Benefits of loyalty programs implementing the disclosed methods and systems include, among other things, an increased number of opportunities for users to redeem their collected loyalty points in a meaningful way that improves the user's perception of the value of the points and the company that offers them. Additionally, loyalty programs implementing the disclosed methods and systems provide the associated company a reduction in the costs to provide the loyalty program, by encouraging users to exchange their points for rewards and offers more frequently, as well as a reduction in costs to the company for the goods and services associated with the rewards and offers by encouraging users to redeem their points for rewards and offers that ultimately lead to a reduced cost to the company for the goods (e.g., by offering rewards for underutilized goods or services).

An example industry that may benefit from a loyalty program implementing the disclosed methods and systems is the gaming industry. Many casinos in the gaming industry offer players (e.g., users/consumers of the casino's goods and services) the opportunity to earn loyalty points in exchange for gaming at casinos and resorts that are part of the casino's network (e.g., commonly owned by a single company or companies). In machine gaming, such as slot machine play, players can accumulate a fixed amount of points per dollars wagered through a series of bets (e.g., a single $1.00 wager may earn 1 point on a particular slot machine, while earning 1 point on another slot machine may require two $0.50 wagers). Table games (e.g., card games, dice games, and the like) can also allow players to earn points through a system of player rating, whereby a manager of a group of tables assigns a player rating to a given player based on, for example a total amount of money the player wagers at a table or tables, an amount of time played at a table or tables, and/or an average size of wagers made at a given table.

Another example industry that may benefit from a loyalty program implementing the disclosed methods and systems is the airline industry. For example, many airlines allow travelers to accumulate loyalty points (e.g., "miles") based on an amount paid per ticket and/or a distance traveled on a given flight or flights. After accumulating a certain number of points, airlines may offer travelers a chance to exchange their points for discounted or reduced fare tickets. As an example, a predetermined number of accumulated points could be exchanged for a discounted or free ticket for a flight (e.g., 50,000 in points are exchanged for a $500 credit toward a flight.). In order to avoid profitability issues, airlines that offer a loyalty program often block specific dates (e.g., points cannot be exchanged for free or reduced-fare travel on a given date or dates) or the airlines may increase the number of points required to exchange for free or reduced fare travel on dates when the airline predicts heavy demand for a specific flight. As there are a finite number of seats on any given flight, and the value of a seat increases when demand for the flight increases, it is in the airline's best interest to incentivize travelers to exchange their points more frequently and for flights with higher profitability margins.

Yet another example industry that could benefit from a loyalty program implementing the disclosed methods and systems is the entertainment industry—specifically movie theaters and performance theaters, where seating and/or standing capacity is limited. As with the airline industry, each seat in a theater has a value that increases or decreases with demand. A loyalty program for movie theaters or performance theaters may allow guests to accumulate points based on how much money is spent (e.g., ticket price and/or concession purchases) and/or how often the guests frequent the theaters (e.g., a certain number of points are awarded for each ticket purchased). After accumulating a certain number of points, guests may receive an offer for a chance to exchange their points for discounted, reduced-price, or free tickets.

Further, the restaurant industry may benefit from a loyalty program implemented using the disclosed methods and systems. As with airlines and theaters, seating is limited in restaurants and certain times have higher demand than others. Also, certain menu items have higher profitability margins than others. Therefore, a loyalty program tailored to a specific restaurant could provide the restaurant with increased brand loyalty while also reducing the cost of providing offers and rewards. A restaurant loyalty program may allow guests to accumulate points based on how much is spent (e.g., a given number of points are awarded relative to the total amount for a check, certain menu items versus other menu items may accumulate more points, etc.) and/or how often the guests frequent the restaurant (e.g., a free menu item is offered after a certain number of visits). After accumulating a certain number of points, guests may receive an offer for a chance to exchange their points for free or reduced-price menu items. As an example, a predetermined number of accumulated points could be exchanged for a discounted or free menu item (e.g., 5,000 in points are exchanged for a $50 credit toward the total check amount.).

The present methods and systems can determine the recommended award for a user, or subset of a plurality of users, based on received (e.g., at a server) user behavior data and individualized user profiles, which can be used to create an individualized predictive model for each user. User behavior data (also referred to herein as behavior information) can comprise information associated with a user received from one or more service providers, such as a travel/transportation company (e.g., airline, train operator, cruise line, bus operator, and the like), a hotel, a restaurant, an event space, a retail establishment, a casino, combinations thereof, and the like. The user behavior data can be collected, for example, by a company via the company's loyalty points program. The information that is collected may be objective information (e.g., factual information) that members of the loyalty points program voluntarily disclose when registering for the program (e.g., demographics, credit history, personal preferences, etc.) or the information may be subjective (e.g., observed behavior) such as spending habits, playing habits, eating habits, travel preferences, and the like (e.g., information that is collected by an application server or related system that administers the loyalty points program and tracks transactions, purchases, plays, etc.)

In some embodiments, the user behavior data can also be received from a mobile device (e.g., a user's mobile phone, tablet, laptop, etc.) with a mobile application installed thereon that implements certain aspects of the present methods and systems (e.g., a mobile application that allows a user to receive offers to exchange points to enter a drawing, transmit a request (e.g., an acceptance of the offer) to enter the drawing, and/or receive any award that is won). The mobile application may collect metadata associated with user behavior (e.g., websites visited, purchases from other companies, applications installed on the mobile device, e-mail accounts, social media, etc.) and transmit the metadata to an application server. User behavior data collected from a mobile device can comprise, for example, user interactions with other users of the mobile application, user purchases, and the like, along with associated times/dates.

In other embodiments, the user behavior can be received from a service provider database that is accessible by the application server (e.g., information collected by one or more companies other than the company operating the subject loyalty points program). In addition to user behavior data, location data can be received as well. Location data can comprise GPS coordinates, longitude/latitude, city, state, country, and the like (e.g., received from a mobile device and/or determined when a card or other credential used for a loyalty program is read by a card reader, such as a card reader at a gaming table). Location data can comprise current location data for a user or users as well as previous location data (e.g., locations a mobile device was present at previous time periods and/or locations at which a card or other credential used for a loyalty program was read by a card reader, such as at a gaming table located near a restaurant).

Service provider utilization data can be received as well (e.g., at an application server), which can comprise one or more of a number of available seats for an event requiring an admission ticket (e.g., a concert, play, opera, movie, etc.), a number of available tables at a restaurant (e.g., unoccupied seats at tables and/or bars), a number of excess inventory for one or more items at a retailer (e.g., an excess of a particular good that may be perishable or seasonal), one or more unoccupied gaming seats at a casino (e.g., open seats at card tables, unoccupied slot machines, etc.), and/or a number of unoccupied rooms at a hotel. The service provider utilization data can also be used to determine which service provider among a plurality of service providers will be a target service provider (e.g., the service provider that furnishes the recommended award). As discussed above, the user behavior data can be used to create a user profile, which in turn can be used to create a predictive model for a user. A predictive model can be individualized for each user and may be used to determine one or more of a user's next purchase, a user's travel plans, and/or a user's future gaming activity. Using the predictive model for each user of a plurality of users, as well as the location data and the service provider utilization data, one or more recommended awards can be determined for a subset of users among the plurality of users based on location (e.g., users currently located near one another geographically) and/or similarities among the plurality of users (e.g., users of similar demographics, income, spending habits, gaming habits, etc.). Optionally, a predetermined user index can be used when determining the one or more recommended awards. The user index can comprise data indicative of one or more of a next purchase amount (e.g., an amount of money based on previous purchase prices), a next purchase location (e.g., at a retailer, restaurant, casino, etc.), a next purchase category (e.g., apparel, food, drinks, gaming tokens, etc.), a travel location, a gaming type (e.g., card games, slot machines, games of skill, etc.), an average wager for a given gaming type, and/or an entertainment type (e.g., movie, play, concert, sporting event, etc.).

As an example, if a user profile indicates that a user has attended a concert in the past and the user behavior data and/or location data indicates that the user is currently in the vicinity of a concert venue (e.g., the user is at a casino with a concert hall on the casino property), an application server may determine that a particular type of concert (or a certain performer) is scheduled for the evening and that there are many unsold seats. The application server may then send out an offer to a predetermined number of users (e.g., 500) similarly situated in the vicinity of the concert venue who have sufficient points available to exchange for a chance to win a ticket to the concert. In an aspect, the awards can be tiered. For example, one tier of awards can comprise a ticket to the concert, while another tier can comprise tickets and a backstage visit with the performer. Yet another tier can comprise a consolation prize (e.g., a small drink credit at a nearby bar or small amount of free play at a nearby gaming table and/or slot machine).

In another example, points for a casino loyalty program can be tracked via a "player account" associated with a given player. The points system can provide a player who is a member of the loyalty program with a credential that can be used to identify the associated player account at a given machine or table (e.g., a card, credential, key fob, etc.). For example, the credential may be a card with a magnetic stripe that stores a card identifier and data relating to the loyalty program (e.g., points balance, locations at which the card was swiped/read, etc.), which can be swiped by a player at a machine or card reader at a table. Once swiped (or read), the machine or credential reader can associate the credential identifier with a player's player account, and the player's wagers, winnings, time played, location at certain times, etc., can be tracked by the loyalty points system (e.g., a network of computers and/or an application server). Further, when a number of points associated with the player account are added or deducted from the account's points balance, the points balance can be stored on the credential by the machine or credential reader.

Points may be convertible into specific rewards or offers of the player's choosing. A reward or offer could include exchanging a predetermined number of accumulated points for one or more free plays (e.g., 5000 accumulated points are exchanged for $5.00 of free play at a slot machine, a card game, a dice game, etc.). As another example, a predetermined number of accumulated points could be exchanged for discounted or free non-gaming goods or services offered at the casino (e.g., 50,000 in points are exchanged for a $50 dining credit at a restaurant on the casino property; 100,000 in points are exchanged for a one-night reservation at a hotel on the casino property, etc.). The amount of points required to enter a chance to win a reward may be less than the cost for the reward if the user chose to purchase the reward for themselves (e.g., a player spent $5,000 to earn the 5,000 points required to enter the drawing, and the reward being offered would cost the player $10,000 if they purchased the reward outright). As an example, seventy-five players may exchange 1,000 points each to enter a competition to win a $50 dining credit at a restaurant on the casino property. Only one of the seventy-five players may be awarded the credit, and the other seventy-four players may forfeit their respective 1,000 points and receive either no reward or, optionally, a less-valuable consolation prize such as a digital coupon for a free appetizer. In this example, the casino would clear a total of 75,000 points for a mere $50 dining credit. Such an example may be applicable to other venues as well (e.g., a video game arcade where points earned from games can be exchanged for prizes, food can be purchased with points, etc.)

In another example, the methods and systems may be used by airlines to entice multiple travelers to exchange a relatively small number of points for a chance to win a free ticket for a last-minute flight. For example, using a mobile application, a user may receive an offer to exchange 20,000 points for a free ticket for a flight three days hence that is 30% empty. In this case, the cost to the airline to provide the free ticket is relatively minimal since the user would likely not be taking a seat of a paying customer. An application server may determine when and for whom the offer to exchange points for a chance to win a free ticket is made (e.g., users with similar spending habits with the airline), and the application server may further set a different amount of required points to exchange for each user (e.g., users who spend a higher amount with the airline in a given time period may be required to exchange only 15,000 points rather than 20,000). For example, the application server may monitor flights and seating availability for weekend flights between Dallas, Tex. and Las Vegas, Nev. It may determine that some of the flights are under-booked and further predict that there may be multiple empty seats on flights both leaving from and returning to Dallas. On a given day, the application server may identify 200 users with sufficient points in their respective balance who are located near Dallas and have shown interest in vacation travel in the past, including travel to Las Vegas (e.g., a mobile application on a user's device sent metadata to the application server indicating that the user's recent search queries relate to visiting Las Vegas). The application server may then transmit offers to these 200 users. For example, the application server may transmit a message to the users' mobile devices, which once received cause a mobile device application installed on the mobile devices to automatically launch and display the offer on the mobile devices' screens. As another example, the offer may be received in an email, a text message, or the like. The offer may include exchanging 2,000 points for a chance to win a roundtrip flight to Las Vegas for two passengers (e.g., departing Friday and returning Sunday) plus accommodations in a hotel. Normally, such a package may cost 80,000 miles, which makes the 2,000 point offer enticing for users. After the application server determines that a fixed number of users have accepted the offer (e.g., a threshold number of respondents), it may then randomly select a user and transmit the reward (e.g., a sufficient number of points may be added to the user's points balance in order to redeem the flight and/or a monetary credit for purchasing the flight and/or hotel may be added to a user's account, etc.). In this example, the airline is able to clear 80,000 points, and users are able to possibly win a trip which may cost 80,000 points outright for a mere 2,000 points.

As yet another example, the methods and systems may be used by a movie or performance theater. A predetermined number of accumulated points may be exchanged for a discounted or free ticket for a movie or performance (e.g., 5,000 in points are exchanged for a $50 credit toward a ticket.). In order to avoid profitability issues, the theaters may block specific dates and/or times (e.g., points cannot be exchanged for free or reduced-price tickets on a given date or dates); the number of points required to exchange for free or reduced-price tickets may increase on dates and times when demand is high.; and/or a ticker voucher or discount may be valid for a limited time only (e.g., within the next hour, day, week, month, etc.)

In still another example, the methods and systems described herein may provide opportunities for companies to offer their products and services to users of a loyalty program not affiliated with the company. For example, a restaurant located near a casino, but not owned by the same company that owns the casino, may contract with the casino to have discounts and/or gift cards for the restaurant presented as rewards for which casino players may exchange their loyalty points to enter a chance to win. In order to attract casino players to the restaurant at the most beneficial time(s) (e.g., when customer traffic is less than normal), the restaurant may provide the casino a set of data (e.g., uploading historical sales data to an application server at the casino) that permits the casino to determine when to have the discounts and/or gift cards for the restaurant presented as rewards. For example, the restaurant may purchase the rights to offer a $50 dining credit as a reward that must be used in a fixed number of days (e.g., reward is obtained on a Tuesday and must be redeemed before Friday). Optionally, or in addition, players who did not win the reward may receive a coupon for a 20% discount on their meal, redeemable for that night only. In this example, the restaurant benefits from having their brand reach out to potentially thousands of new customers and also increasing customer traffic during a normally low-traffic time frame. The casino likewise benefits from the revenue generated by selling the rights to offer the restaurant dining credit as a reward.

While the above examples discuss ways in which companies in specific industries may implement the present methods and systems, it is to be understood that the methods and systems are applicable to companies, or persons, operating in many other industries not discussed herein. Nearly any company or business with a loyalty points program may benefit from the present methods and systems. The wide-range applicability is due to the methods' and systems' consideration of user behavior as well as user location data—both of which are attributes common to almost all types of consumers, customers, players, guests, etc.

FIG. 1 illustrates various aspects of an exemplary environment in which the present methods and systems can operate. One skilled in the art will appreciate that provided herein is a functional description and that the respective functions can be performed by software, hardware, or a combination of software and hardware. In an aspect, disclosed is a user device 102 (e.g., mobile phone, tablet, laptop, e-reader, etc.) in communication with a computing device 104 such as a server (e.g., an application server), for example. In an aspect, the user device 102 can be an electronic device such as a computer, a smartphone, a laptop, a tablet, a computing device, programmable consumer electronics, or other device capable of communicating with the computing device 104. The computing device 104 can be disposed locally or remotely relative to the user device 102. As an example, the user device 102 and the computing device 104 can be in communication via a private and/or public network 105 such as the Internet, a local area network, a wide area network, a cellular network, a satellite network, combinations thereof, and the like. Other forms of communications can be used such as other wired and wireless telecommunication channels, for example.

The user device 102 can comprise a processor 106. The processor 106 can be, or can comprise, any suitable microprocessor or microcontroller, for example, a low-power application-specific controller (ASIC) and/or a field programmable gate array (FPGA) designed or programmed specifically for the task of controlling a device as described herein, or a general purpose central processing unit (CPU), for example, one based on 80×86 architecture as designed by Intel™ or AMD™, or a system-on-a-chip as designed by ARM™. The processor 106 can be coupled to auxiliary devices or modules of the user device 102 using a bus or other coupling.

The user device 102 can comprise a non-transitory memory device 108 coupled to the processor 106. The memory device 108 can comprise a random access memory (RAM) configured for storing program instructions and data for execution or processing by the processor 106 during control of the user device 102. When the user device 102 is powered off or in an inactive state, program instructions and data can be stored in a long-term memory, for example, a non-volatile magnetic optical, or electronic memory storage device (not shown). Either or both of the RAM or the long-term memory can comprise a non-transitory computer-readable medium storing program instructions that, when executed by the processor 106, cause the user device 102 to perform all or part of one or more methods and/or operations described herein. Program instructions can be written in any suitable high-level language, for example, C, C++, C #or the Java™, and compiled to produce machine-language code for execution by the processor 106.

In an aspect, the user device 102 can comprise a network access device 110 allowing the user device 102 to be coupled to one or more ancillary devices such as via an access point (e.g., a network device 126) of a wireless telephone network, local area network, or other coupling to a wide area network, such as for example, the Internet. In that regard, the processor 106 can be configured to share data with the one or more ancillary devices via the network access device 110. The shared data can comprise, for example, call data, messaging data, usage data, location data, and/or operational data of the user device 102, a status of the user device 102, a status and/or operating condition of one or more the components of the user device 102, text to be used in a message, a product order, payment information, and/or any other data. Similarly, the processor 106 can be configured to receive control instructions from the one or more ancillary devices via the network access device 110. For example, a configuration of the user device 102, an operation of the user device 102, and/or other settings of the user device 102, can be controlled by the one or more ancillary devices via the network access device 110. For example, an ancillary device can comprise the computing device 104 that can provide various services.

In an aspect, the user device 102 can comprise a global positioning system (GPS) unit 112. The GPS unit 112 can detect a current location of the user device 102. In some aspects, a user can request access to one or more services that rely on a current location of the user. For example, a processor in the user device 102 can receive location data from the GPS unit 112, convert it to usable data, and transmit the usable data to the one or more services via the network access device 110. GPS unit 112 can receive position information from a constellation of satellites operated by the U.S. Department of Defense. Alternately, the GPS unit 112 can be a GLONASS receiver operated by the Russian Federation Ministry of Defense, or any other positioning device capable of providing accurate location information (e.g., LORAN, inertial navigation, and the like). The GPS unit 112 can contain additional logic, either software, hardware or both to receive the Wide Area Augmentation System (WAAS) signals, operated by the Federal Aviation Administration, to correct dithering errors and provide the most accurate location possible. Overall accuracy of the positioning equipment subsystem containing WAAS is generally in the two meter range.

The user device 102 can comprise a communication element 114 for providing an interface to a user to interact with the user device 102 and/or the computing device 104. The communication element 114 can be any interface for presenting and/or receiving information to/from the user, such as an offer to exchange one or more points for a chance to win an award or to play a game of chance, skill, or a skill/chance hybrid to win an award. An example interface may be a communication interface such as a web browser (e.g., INTERNET EXPLORER®, MOZILLA FIREFOX®, GOOGLE CHROME®, SAFARI®, or the like). Other software, hardware, and/or interfaces can be used to provide communication between the user and one or more of the user device 102 and the computing device 104. The communication element 114 can request or query various files from a local source and/or a remote source. For example, the communication element 114 can transmit to and receive data from a local or remote device such as the computing device 104 (e.g., an application server). As a further example, the communication element 114 can utilize the network access device 110 to transmit to and receive data from a local or remote service provider 116 (e.g., restaurant, retailer, theater, casino, event space, etc.) and/or the computing device 104 associated with user behavior (e.g., airline reservation, car rental, hotel, accommodations, dining, commercial activity such as purchases, entertainment spending (e.g., spa, alcohol, gaming, concerts, retail purchases, etc.)).

The service provider 116 can comprise any service provider a user might encounter. For example, the service provider 116 can comprise an airline, through which the user books a flight. The service provider 116 can comprise a coffee shop at which the user purchases food and/or drinks. The service provider 116 can comprise a retail shop at an airport at which the user purchases an item. The service provider 116 can comprise a rental car company from which the user rents a vehicle. The service provider 116 can comprise a restaurant at which the user purchases food and/or drinks. The service provider 116 can comprise an entertainment facility (e.g., arcade, driving range, casino, concert venue, and the like) at which the user spends time and money on entertainment related activities.

In an aspect, a user of the user device 102 can comprise an account with the service provider 116 for the purpose of tracking interactions between the user/user device 102 and the service provider 116 (e.g., a loyalty program account). Behavior data can comprise, for example, scheduled flights, scheduled meetings, scheduled travel routes, social events, gaming habits, spending history, and the like. Behavior data can further comprise time and location the user device 102, commercial transactions involving a user of the user device 102, frequent operational settings and/or measurements associated with the user device (e.g., airplane mode, Wi-Fi enabled/disabled, accelerometer measurements, etc.). For example, purchases made (along with associated date data, time data, purchase amount data, location data, nearby users data, combinations thereof, and the like) can be tracked via the account. Data generated based on the interactions between the user/user device 102 and the service provider 116 can be transmitted to the user device 102 for storage in the memory device 108 and/or processing by the processor 106, stored at the service provider 116 transmitted to the computing device 104 for storage (e.g., on the application server) and/or processing, combinations thereof, and the like. Data can be transmitted by and between any of the user device 102, the service provider 116, and/or the computing device 104 either locally (e.g., BLUETOOTH® (a wireless technology standard used for exchanging data between fixed and mobile devices)) or via the network 105. In an aspect, the user device 102 can be used to effectuate the interactions with the service provider 116. For example, the user device 102 can comprise one or more software applications ("apps") through which a user can make a purchase. In some aspects the apps are specific to a service provider 116 and in other aspects a single app can be used to interact with multiple service providers 116. The data thus generated can be referred to as behavior data. Behavior data can be collected to build a historical record of a user's behavior. The behavior data can also be collected and analyzed in real-time. In an aspect, the behavior data can further comprise data from other sources such as a weather service and/or a social media service.

In an aspect, behavior data can be extracted from one or more communications between the service provider 116 and the user/user device 102. For example, in the event a user books a flight through an airline or travel agency, behavior data can be extracted from a confirmation email sent to the user/user device 102. In another aspect, the behavior data is transmitted and/or stored upon generation.

In an aspect, the user device 102 can be associated with a user identifier or device identifier 118. As an example, the identifier 118 can be any identifier, token, character, string, or the like, for differentiating one user or user device (e.g., user device 102) from another user or user device. In a further aspect, the identifier 118 can identify a user or user device as belonging to a particular class of users or user devices. As a further example, the identifier 118 can comprise information relating to the user device such as a manufacturer, a model or type of device, a service provider associated with the user device 102, a state of the user device 102, a locator, and/or a label or classifier. Other information can be represented by the identifier 118. The identifier 118 can be associated with the behavior data and can accompany transmissions of the behavior data to ensure the behavior data is associated with the correct user/user device 102. In an aspect, the identifier 118 can be used to encrypt the behavior data (e.g., hash).

In an aspect, a behavior data analysis module 120 can analyze the behavior data. In an aspect, the behavior data analysis module 120 can be resident on the user device 102, the service provider 116, the computing device 104, combinations thereof, and the like. The behavior data analysis module 120 can identify logical relationships within and among the behavior data. The behavior data analysis module 120 can generate one or more predictive models based on the analysis. The behavior data can be used in regression models and/or neural network models for the detection of certain behaviors or patterns. In an aspect, a predictive model may be developed to predict spending at service providers 116, responses to particular offers or other marketing schemes, and the like. The predictive model can be trained using a portion of the behavior data. As more behavior data is collected, the predictive model can improve prediction accuracy. Thus, some or all of the behavior data can be used as training data for the predictive model. Based on the behavior data, the predictive model is trained, using known techniques such as neural network backward propagation techniques, linear regression, and the like. A predicted response, a predicted interaction, and/or purchasing behavior can then be generated based on input of real-time behavior data into the predictive model created with historical behavior data.

In an aspect, future interactions (e.g., for time periods for which there is no actual data as of yet) can be predicted based on past behavior data and/or location data. In another aspect, retrospective analysis can be performed by inputting behavior data from a recent past time period for which data is available into the predictive model. The behavior data can be used to generate the appropriate variables for input into the predictive model. For example, the behavior data can be used to build a predictive model that will predict what a user/user device 102 will interact with during the course of a particular stay, during a particular travel event, or a particular visit to a company's place of business. For example, if the behavior data reflects that a user device 102 is always located at a coffee shop after arrival at an airport, the predictive model, when presented with real-time data indicating that the user device 102 just arrived at an airport, can predict that the user behavior will be to seek out a coffee shop in the near term. In another aspect, if the user device 102 is used in a transaction at a specific service provider 116 and/or a specific type of service provider 116 when the user device 102 is in between arrival at an airport and departure from the airport (e.g., on a "trip"), then the predictive model, when presented with real-time data indicating that the user device 102 is on a trip, can predict that the user behavior will be to seek out the specific service provider 116 and/or a specific type of service provider 116 in the near term.

In an aspect, the computing device 104 can be a server (e.g., an application server) for communicating with the user device 102. As an example, the computing device 104 can communicate with the user device 102 for providing data and/or services. The data and/or services can comprise storage/processing of behavior data, storage/processing of the behavior data analysis module 120, storage/processing of a recommendation module 122, storage/processing of an award processing module 128, combinations thereof, and the like. In an aspect, the computing device 104 can allow the user device 102 to interact with remote resources such as data, devices, service providers, and files. As an example, the computing device 104 can be configured as (or disposed at) a central location, which can receive behavior data from multiple sources (e.g., the user device 102 and/or the service provider 116).

In an aspect, the computing device 104 can manage the communication between the user device 102 and a database 124 for sending and receiving data therebetween. As an example, the database 124 can store behavior data, identifier 118, service provider 116 information, award information, points information, and/or other information. As a further example, the user device 102 can request and/or retrieve a file from the database 124. In an aspect, the database 124 can store behavior data relating to the user device 102. As an example, the computing device 104 can obtain the identifier 108 from the user device 102 and retrieve behavior data from the database 124. The computing device 104 can also receive and store behavior data received from the service provider 116 in the database 124. Any information can be stored in and retrieved from the database 124. The database 124 can be disposed remotely from the computing device 104 and accessed via direct or indirect connection. The database 124 can be integrated with the computing device 104 or some other device (e.g., user device 102, network device 126) or system.

In an aspect, the computing device 104 can comprise the recommendation module 122 that can generate one or more recommended awards for the user/user device 102 based on output from the behavior data analysis module 120. The one or more recommended awards can comprise, for example, a ticket to an event, special offer, a credit at a retail establishment, a credit at a restaurant/bar, a credit at a spa, a credit at a casino for gaming, and the like. Further, the one or more recommended awards can be associated with the identifier 118 of the user device 102. As an example, the identifier may be a unique identifier for advertising (IDFA), an international mobile equipment identity (IMEI), an International Mobile Subscriber Identity (IMSI), and the like. The identifier 118 can be associated with, for example, a ticket to an event that is offered as an award of the one or more recommended awards. The user device 102 may utilize near-field communication (NFC) (or similar technology, such as BLUETOOTH® (a wireless technology standard used for exchanging data between fixed and mobile devices), Wi-Fi, etc.), which can permit the user device 102 and the identifier 118 to function as a physical ticket when read at a ticket or credential reader that permits NFC.

The recommendation module 122 can access one or more sources of data related to service providers 116 (e.g., data indicative of one or more underutilized goods or services offered by one or more of the service providers). In an aspect, the recommendation module 122 can request data to be used in a recommendation directly from the service providers 116. In another aspect, a database of service provider 116 information (e.g., locations, special offers, current utilization of goods or services, point balances for users, etc.) can be maintained by the recommendation module 122. The recommendation module 122 can utilize the database of service provider 116 information to identify underutilized goods/services (e.g., amenities, inventory of stock, seats at a restaurant or gaming table or theater) in real-time. The recommendation module 122 can thus determine an award that comprises under-used goods or services that is targeted to a user who may be interested in the under-used goods or services and who has sufficient points to exchange for an attempt to win the under-used goods or services.

For example, if the behavior data analysis module 120 indicates that a user has an affinity for coffee, the recommendation module 122 can access the database of service provider 116 information to determine a coffee shop in proximity to the user device 102 that is currently underutilized, determine an award (e.g., credit for a free coffee) and associated point requirements to enter to win the award, and provide the offer to exchange points to attempt to win the award to the user and/or any other users in proximity to the coffee shop. By way of further example, if the behavior data analysis module 120 indicates that a user has an affinity for dining at a specific service provider 116 based on past behavior data indicating that the user dines at the specific service provider 116 whenever traveling to the user device's 102 current location, then the recommendation module 122 can determine whether the service provider 116 (or similar service provider) is currently underutilized, determine an award (e.g., credit towards dinner) and associated point requirements to enter to win the award, and provide the offer (e.g., via an application launching on the mobile device 102 and displaying the offer) to exchange points to attempt to win the award to the user and/or any other users in proximity to the service provider 116. Other awards are contemplated, such as access to more exclusive tables at the service provider 116, access to a more select menu, and the like.

In an aspect, the computing device 104 can comprise the award processing module 128. The award processing module 128 can be configured to receive entries from one or more users to win one or more awards. The award processing module 128 can determine if a user has sufficient points to expend towards winning an award. The award processing module 128 can determine a duration for which an award is valid and provide the duration to the user device 102 along with the offered award from the recommendation module 122. In an aspect, the award processing module 128 can administer the determination of a winner of the award. For example, if the award is offered as part of a lottery or raffle-style game then the award processing module 128 can select one or more winners of the lottery or raffle-style game at random and issue the awards to the winning users. In an aspect, the award processing module 128 can process one or more tiers of awards and select one or more winners within each of the tiers. In another aspect, if the award is offered as part of a game of chance, skill, or skill/chance hybrid the award processing module 128 can host the game of chance, skill or skill/chance hybrid and determine one or more winners based on the outcome of the game of chance, skill or skill/chance hybrid.

Figure 2:
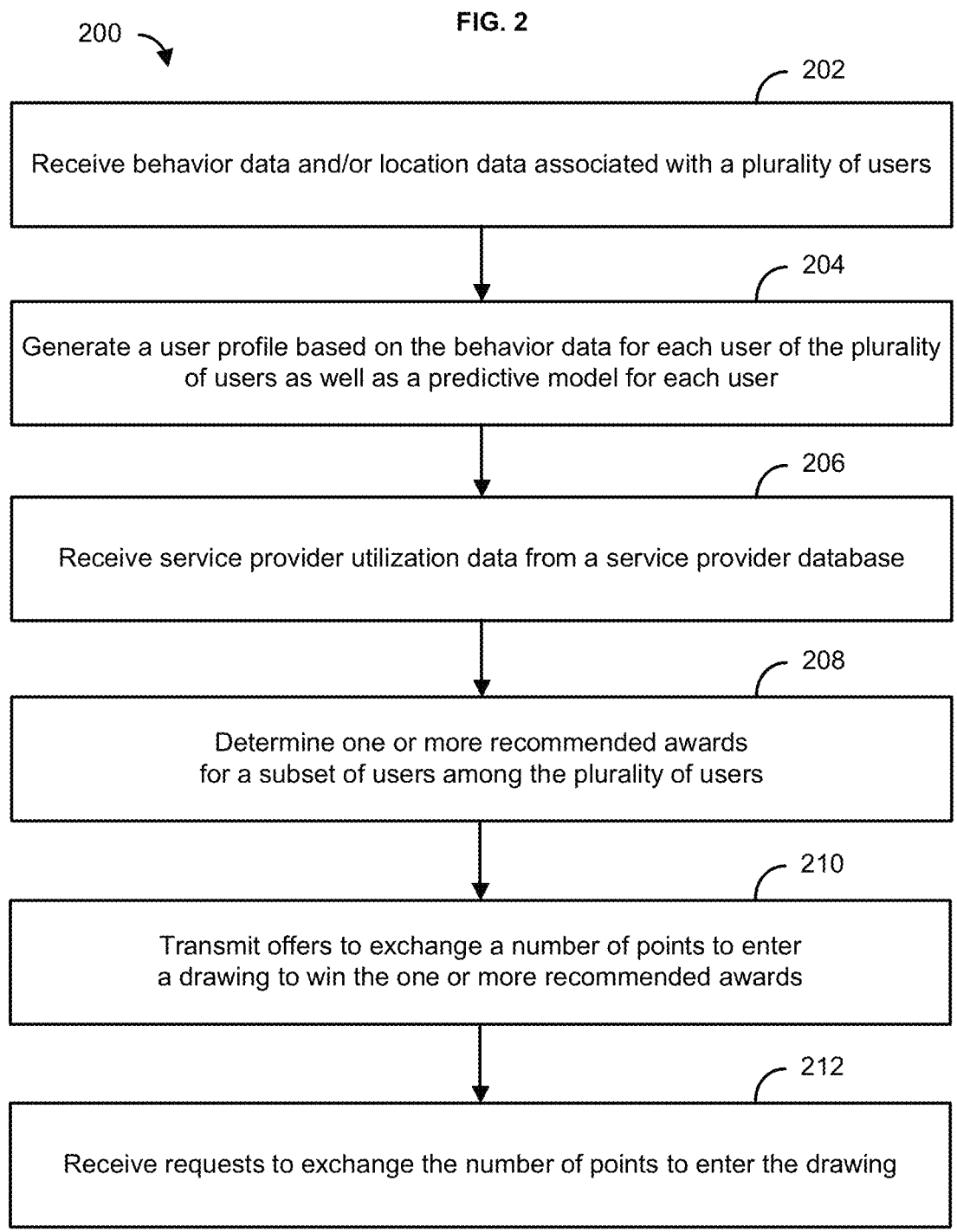
FIG. 2 is a flowchart illustrating an example method.

Turning now to FIG. 2, a flowchart illustrating an example method 200 is shown. At step 202 a user device (e.g., user device 102) and/or a server (e.g., computing device 104) can receive behavior data and/or location data associated with a plurality of users. In an aspect, the behavior data can be from a plurality of service providers (e.g., airline service provider, hotel and accommodations service provider, location and map service provider, weather service provider, communication service provider, recreational service provider, etc.). In another aspect, the behavior data can be derived from and/or extracted from a mobile device associated with a user (e.g., email, social media, SMS message, applications, etc.). In a further aspect, the behavior data can be received directly from the plurality of service providers (e.g., via a common gateway interface (GGI), via an open database connection (ODBC), via an application programming interface (API), and the like). The behavior data can comprise information associated with a user's interactions associated with a stay at a resort (e.g., flight information, transportation information, room information, dining interactions, retail interactions, entertainment interactions, and any other similar information). The behavior data can be received and stored over time to create historical behavior data. Further, the behavior data can comprise a user's purchase history, a current location of a user, and/or previous locations of the user.

At step 204, both a user profile, based on the behavior data for each user of the plurality of users, as well as a predictive model for each user, based on the respective user profile, can be generated. For example, regression models and/or a neural network model can be used. In an aspect, a neural network can be trained on at least a portion of the historical behavior data to generate the predictive model. Further, the predictive model for each user can be individualized, and it may comprise data that is indicative of one or more of a user's next purchase, a user's travel plans, and/or a user's future gaming activity. Additionally, a user index may be generated, based on the user behavior data, which may comprise vector data indicative of two or more of a next purchase amount, a next purchase location, a next purchase category, a travel location, a gaming type, an average wager for a given gaming type, or an entertainment type (e.g., the user index may indicate that a user is likely to purchase $50 worth of gaming credit at a certain tomorrow based on user behavior data indicating the user purchased the same amount of gaming credit from the same casino the previous three days).

At step 206, service provider utilization data can be received from a service provider database that is communication with an application server. The service provider utilization data can detail information about goods or services that are currently underutilized. For example the information may include a number of available tables at a restaurant (e.g., unoccupied seats at tables and/or bars), a number of excess inventory for one or more items at a retailer (e.g., an excess of a particular good that may be perishable or seasonal), one or more unoccupied gaming seats at a casino (e.g., open seats at card tables, unoccupied slot machines, etc.), open seats on an airline flight, and/or a number of unoccupied rooms at a hotel.

At step 208, one or more recommended awards for a subset of users among the plurality of users (e.g., users currently located near one another geographically) and/or similarities among the plurality of users (e.g., users of similar demographics, income, spending habits, gaming habits, etc.) can be determined. The determination may be based on the predictive model for each user as well as the location data and the service provider utilization data (e.g., the one or more recommended awards comprise underutilized goods or services offered by a target service provider). Optionally, the predetermined user index may also be used when determining the one or more recommended awards. In an aspect, the one or more recommended awards can be associated with one or more service providers, such as a concert, a play, an exhibition, a sporting event, a dining location, a commercial outlet, and/or the like. The user behavior data may additionally indicate an affinity of a user to one or more service providers. The determined affinities can be used in conjunction with the service provider utilization data to identify service providers that the user has an affinity for and that have underutilized goods or services. The one or more recommended awards can be monetary in nature (e.g., credit) or experience-based (e.g., back stage access), or monetary and experience based.

At step 210, an offer can be transmitted to the subset of users (e.g., a message is transmitted to mobile devices associated with the users and causes an application installed on the mobile devices to automatically launch and display the offer on the mobile devices' screens) to exchange a number of points (e.g., points associated with a user's loyalty program points balance) to enter a drawing to win the one or more recommended awards. In an aspect, a user and/or subset of users with sufficient points can be determined prior to transmitting the offer to exchange the number of points to enter the drawing to win the recommended award(s). The number of points required to enter the drawing may be individualized for each user based on each user's respective user profile (e.g., a user with a substantial amount of points may be required to exchange less points than a user with a lower number of points) and each user's respective predictive model (e.g., less points may be required if a user's predictive model indicates he or she is not likely to desire the reward).

At step 212, one or more requests (e.g., replies to the offer) can be received from one or more users to exchange the number of points required to enter the drawing to win the one or more recommended awards. In an aspect, each user desiring to win the recommended award(s) can have the appropriate amount of points deducted from their points balance. Once all requests have been received (e.g., at the expiration of a predetermined duration), one or more winners can be selected to receive the recommended award. In the event one or more tiers of recommended awards were generated, one or more winners within the one or more tiers can be determined. Confirmation of winning the recommended award can be provided to a user device which can be used to redeem the award at the appropriate service provider. For example, a QR code can be transmitted to the user device of the winner (or winners) which can be scanned at a ticket office for a concert venue, a cashier at a restaurant, a gaming machine, and the like. As another example, the award can be associated with an identifier of the user device (e.g., IDFA, IMEI, IMSI, etc.). The user device may utilize NFC (or similar technology, such as BLUETOOTH® (a wireless technology standard used for exchanging data between fixed and mobile devices), Wi-Fi, etc.), which can permit the user device and the identifier to function as a credential (e.g., event or movie ticket, gaming credit, restaurant credit or coupon, etc.) for receiving the award when the user device is read by a NFC-capable (or BLUETOOTH® (a wireless technology standard used for exchanging data between fixed and mobile devices), Wi-Fi, etc.) reader.

Figure 3:
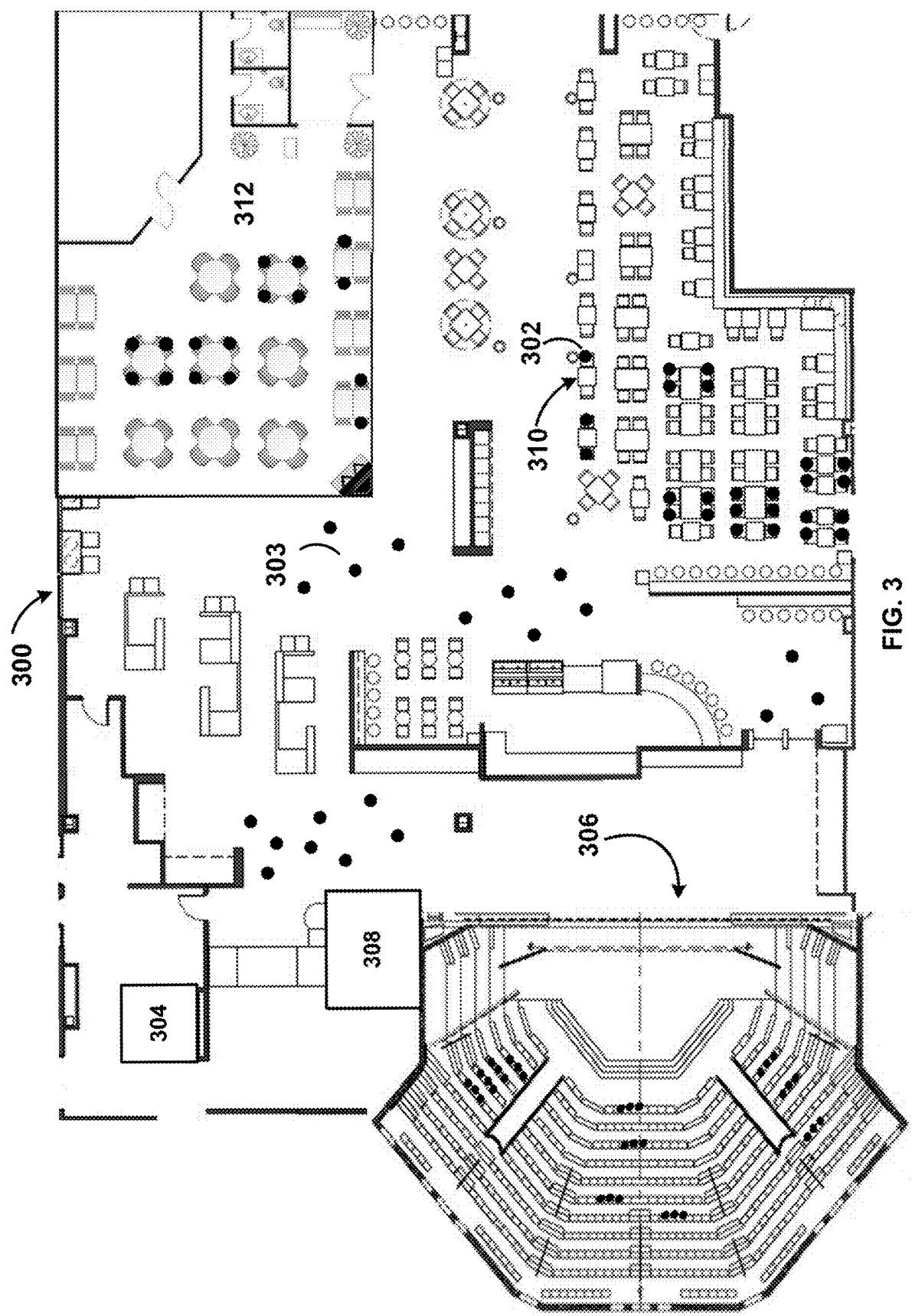
FIG. 3 is an overhead view of an example service provider's facility.
Figure 4A:
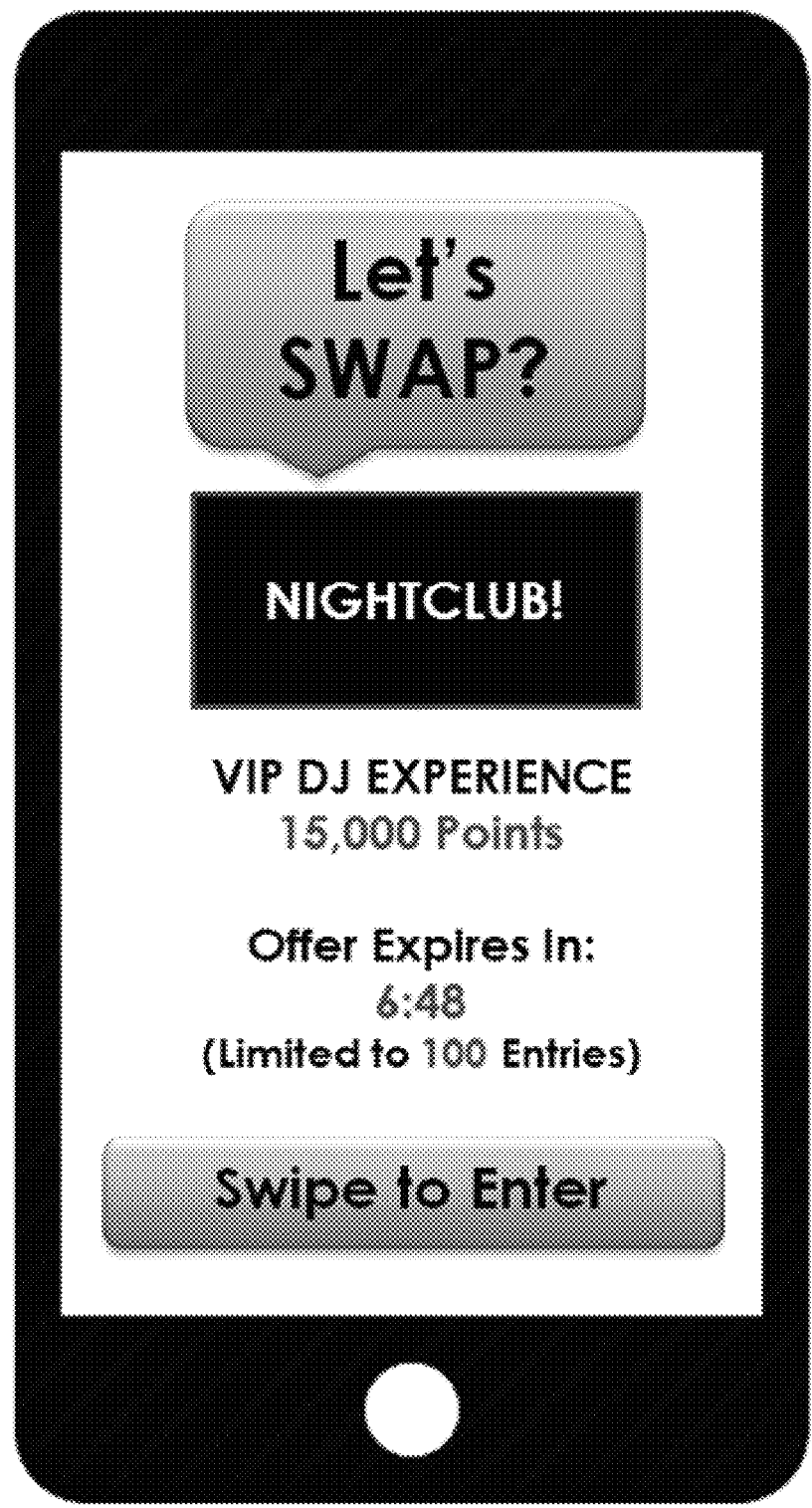
FIG. 4A is a view of a mobile device interface.
Figure 4B:
FIG. 4B is a view of a mobile device interface.

Turning now to FIG. 3, an overhead view of an example casino 300 operating a loyalty points program implementing the present methods and systems is depicted. Casino players 302 can download an application onto their respective mobile devices and receive periodic offers to exchange a predetermined number of their loyalty points to enter a competition or drawing against other users for a specific reward(s). The mobile devices running the application may communicate information about the players 302 associated with the mobile devices, such as geographic location (e.g., where the players 302 are located within the casino) and recent gaming activity (e.g., type of game, wagers, winnings, etc.) to an application server 304 (e.g., a computer or network of computers that track information relevant to the loyalty points program). Periodically, based on location, gaming activity, previous purchase(s), etc., the players 302 may receive an offer on the screens of their mobile devices inviting them to exchange a fixed number of points to enter a chance to win a reward (e.g., multiple players are invited to exchange the fixed number of points for the same reward). The application server 304 may transmit a message to the mobile devices, which when received can cause the mobile application to launch (e.g., execute) and cause the message to be displayed on the screens of the mobile devices automatically (e.g., without the users opening the application). If the player chooses to exchange the points, the player's points will be removed from their account. Once a predetermined number of entries has been received (e.g., by the application server 304), a winner can be selected and the reward can be delivered to the player (e.g., electronically, physically, etc.). For example, FIG. 4A is a front view of a mobile device displaying an offer (e.g., after the message is sent by the application server 304 to the mobile device) to a player 302 to exchange points to enter a drawing with one or more other players for a chance to win a recommended award (e.g., a VIP DJ experience). In an aspect, the mobile device can be the user device 102. Further, the offer to exchange the points may have an expiration in order to limit the availability of a particular award. FIG. 4B is a front view of the mobile device illustrating a confirmation to the player 302 that the player 302 won the recommended award and that the user can utilize a transmitted confirmation to redeem the recommended award. For example, in the event of winning tickets to a show or event being performed a concert hall 306 on the casino property, the winning player's 302 player account (e.g., accessible by the mobile device application) could receive a QR code that may be scanned at a ticket office (e.g., ticket office 308) to confirm the reward and distribute the tickets. As another example, the tickets may be associated with an identifier of the user device 102 (e.g., IDFA, IMEI, IMSI, etc.). The user device 102 may utilize NFC (or similar technology, such as BLUETOOTH® (a wireless technology standard used for exchanging data between fixed and mobile devices), Wi-Fi, etc.), which can permit the user device 102 and the identifier to function as a credential (e.g., the event ticket(s)) for redeeming the ticket(s) when the user device 102 is read by a NFC-capable (or BLUETOOTH® (a wireless technology standard used for exchanging data between fixed and mobile devices), Wi-Fi, etc.) reader.

Returning to FIG. 3, in another example the application server 304 can track a player's 302 location within the casino property and collect behavior data. For example, the application server 304 may determine that a player 302 is playing at a card table 310 on the property at 4:00 pm on a Thursday, based on a credential reader at the card table 310 that reads a player's credential (e.g., loyalty card, key fob, mobile device, etc.) and/or based on data sent to the application server from the user's mobile device (e.g., data from a mobile application associated with the points program). The application server 304 may then record data indicating the player 302 is currently located on the casino property and has a point balance of 13,000 points. The application server 304 may then also mark that player 302 as likely to be interested in exchanging points for a chance to win free or reduced-price dining at a casino-owned restaurant for that evening. The application server 304 may determine that a target restaurant (e.g., restaurant 312) on the casino property (e.g., a steak house) has been underperforming on weekdays and the application server 304 identifies said target restaurant as an efficient reward to offer due to its underutilization. The application server 304 may then transmit a message to mobile devices associated with 100 players 302 similarly marked as likely to be interested in exchanging points for a chance to win free or reduced-price dining at the target restaurant for that evening. The message may cause an application installed on the mobile devices to automatically launch and cause an offer to be displayed on the screens of the mobile devices inviting the 100 players 302 to exchange 2,000 points and compete against 20 other players 302 for a $50 dining credit at the target restaurant, which may be valid for that evening only. Optionally, or in addition, once the message is received by the mobile devices, the mobile device application may create a notification (e.g., e-mail, text, audio alert, visual alert, etc.) on their mobile devices comprising details of the offer. Players 302 who choose to enter the competition will then have 2,000 points deducted from their respective points balance. After a threshold number (e.g. 20) players 302 have committed to exchange their points to enter the competition, the application server 304 may then execute a random drawing and inform all players 302 whether they won or not. The application server 304 may then deliver the reward via the mobile application (e.g., providing a QR code that can be scanned at the target restaurant, storing on a player card information regarding the reward, etc.). Alternatively, the application server 304 may associate the reward with an identifier of the mobile device (s) (e.g., IDFA, IMEI, IMSI, etc.). The mobile device(s) may utilize NFC (or similar technology, such as BLUETOOTH® (a wireless technology standard used for exchanging data between fixed and mobile devices), Wi-Fi, etc.), which can permit the mobile device(s) and the identifier to function as a credential (e.g., the dining credit is redeemed when the mobile device(s) is read by a NFC-capable (or BLUETOOTH® (a wireless technology standard used for exchanging data between fixed and mobile devices), Wi-Fi, etc.) reader at the restaurant). In this example, the benefit to the casino is threefold: clearing a 70,000 point liability, providing an opportunity for players 302 to exchange their points, and ensuring that the reward is distributed at a time when the expected cost of delivering the reward is lower than the average cost of delivering the reward (e.g., when the target restaurant has excess seating capacity).

Figure 5:
FIG. 5 is a view of a mobile device interface.

In some embodiments, a player 302 or a group of players 303 may receive an offer (e.g., via a message sent by the application server 304 that causes mobile devices associated with the group of players 303 to automatically launch an installed mobile application and display the offer on the mobile devices' screens) to exchange points for a recommended award without entering a drawing (e.g., a direct swap of points for a gift certificate, discount, etc.). FIG. 5 shows an example offer received at a mobile device to swap points for a dining credit. For example, a service provider inside a casino (e.g., restaurant 312) may be underperforming on a certain day and/or timeframe. In response, the application server 304 may determine that a player 302 or a group of players 303 are near the restaurant and subsequently push to their respective mobile devices a message that causes the mobile devices to automatically launch an installed mobile application and display on the mobile devices' screens an offer to swap 10,000 points for a $100 dining credit at the restaurant 312. In this example, the restaurant benefits by increasing traffic at a time when business is slow and/or the casino benefits by clearing a large number of points. Also, while the above example was for a restaurant inside a casino, the offers to directly swap points without entering a drawing can apply to many other service providers as well (e.g., hotels, airlines, theaters, etc.).

Figure 6:
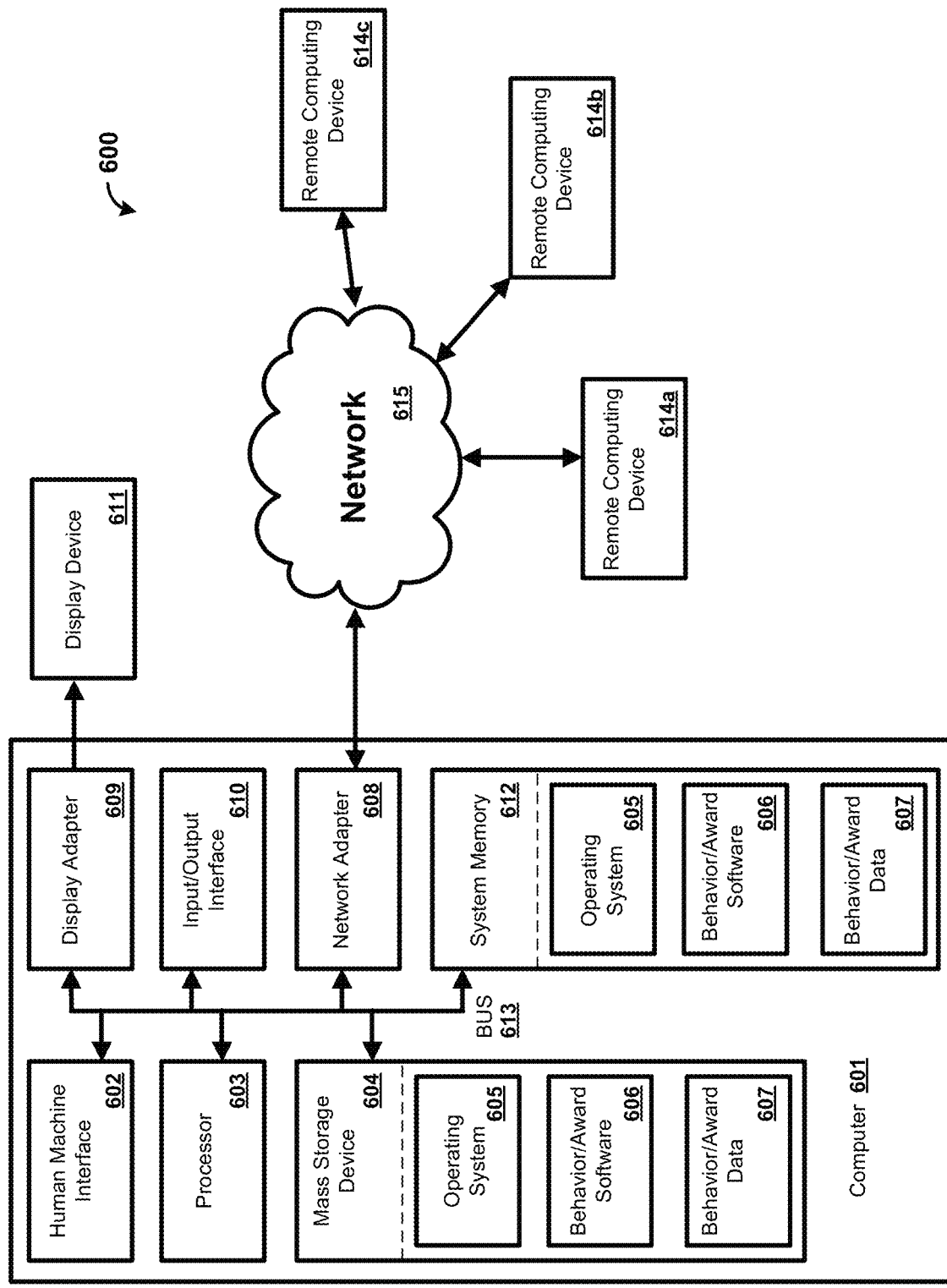
FIG. 6 is a block diagram of another exemplary system.

In an exemplary aspect, the methods and systems can be implemented on a computing system, such as computing device 601 as illustrated in FIG. 6 and described below. By way of example, one or more of the user device 102 and the computing device 104 of FIG. 1 can be a computer as illustrated in FIG. 6. Similarly, the methods and systems disclosed can utilize one or more computers to perform one or more functions in one or more locations. FIG. 6 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computing device 601. The components of the computing device 601 can comprise, but are not limited to, one or more processors or processing units 603, a system memory 612, and a system bus 613 that couples various system components including the processor 603 to the system memory 612. In the case of multiple processing units 603, the system can utilize parallel computing.

The system bus 613 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 613, and all buses specified in this description can also be implemented over a wired or wireless network connection and each of the subsystems, including the processor 603, a mass storage device 604, an operating system 605, behavior/award software 606, behavior/award data 607, a network adapter 608, system memory 612, an Input/Output Interface 610, a display adapter 609, a display device 611, and a human machine interface 602, can be contained within one or more remote computing devices 614a,b,c at physically separate locations, connected through buses of this form, in effect implementing a fully distributed system.

The computing device 601 typically comprises a variety of computer readable media. Exemplary readable media can be any available media that is accessible by the computing device 601 and comprises, for example and not meant to be limiting, both volatile and non-volatile media, removable and non-removable media. The system memory 612 comprises computer readable media in the form of volatile memory, such as random access memory (RAM), and/or non-volatile memory, such as read only memory (ROM). The system memory 612 typically contains data, such as behavior/award data 607, and/or program modules, such as operating system 605 and behavior/award software 606, that are immediately accessible to and/or are presently operated on by the processing unit 603.

In another aspect, the computing device 601 can also comprise other removable/non-removable, volatile/non-volatile computer storage media. By way of example, FIG. 6 illustrates a mass storage device 504 which can provide non-volatile storage of computer code, computer readable instructions, data structures, program modules, and other data for the computing device 601. For example and not meant to be limiting, a mass storage device 604 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), solid state drives, and the like.

Optionally, any number of program modules can be stored on the mass storage device 604, including by way of example, an operating system 605 and behavior/award software 606. Each of the operating system 605 and behavior/award software 606 (or some combination thereof) can comprise elements of the programming and the behavior/award software 606. Behavior/award data 607 can also be stored on the mass storage device 604 Behavior/award data 607 can be stored in any of one or more databases known in the art. Examples of such databases comprise, DB2®, Microsoft® Access, Microsoft® SQL Server, Oracle®, MySQL, PostgreSQL, and the like. The databases can be centralized or distributed across multiple systems.

In another aspect, the user can enter commands and information into the computing device 601 via an input device (not shown). Examples of such input devices comprise, but are not limited to, a keyboard, pointing device (e.g., a "mouse"), a microphone, a joystick, a scanner, tactile input devices such as gloves, and other body coverings, and the like. These and other input devices can be connected to the processing unit 603 via a human machine interface 602 that is coupled to the system bus 613, but can be connected by other interface and bus structures, such as a parallel port, game port, an IEEE 1394 Port (also known as a Firewire port), a serial port, or a universal serial bus (USB).

In yet another aspect, a display device 611 can also be connected to the system bus 613 via an interface, such as a display adapter 609. It is contemplated that the computing device 601 can have more than one display adapter 609 and the computer 601 can have more than one display device 611. For example, a display device can be a monitor, an LCD (Liquid Crystal Display), or a projector. In addition to the display device 611, other output peripheral devices can comprise components, such as speakers (not shown) and a printer (not shown) which can be connected to the computing device 601 via Input/Output Interface 610. Any step and/or result of the methods can be output in any form to an output device. Such output can be any form of visual representation, including, but not limited to, textual, graphical, animation, audio, tactile, and the like. The display 611 and computing device 601 can be part of one device, or separate devices.

The computing device 601 can operate in a networked environment using logical connections to one or more remote computing devices 614*a,b,c*. By way of example, a remote computing device can be a personal computer, portable computer (e.g., tablet computer, laptop, etc.), a smart phone, a server, a router, a network computer, a peer device or other common network node, and so on. Logical connections between the computing device 601 and a remote computing device 614*a,b,c* can be made via a network 615, such as a local area network (LAN) and a general wide area network (WAN). Such network connections can be through a network adapter 608. A network adapter 608 can be implemented in both wired and wireless environments. Such networking environments are conventional and commonplace in dwellings, offices, enterprise-wide computer networks, intranets, and the Internet.

For purposes of illustration, application programs and other executable program components, such as the operating system 605, are illustrated herein as discrete blocks, although it is recognized that such programs and components reside at various times in different storage components of the computing device 601, and are executed by the data processor(s) of the computer. An implementation of behavior/award software 606 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information, such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. A method comprising:
   receiving, at an application server, historical behavior data associated with a plurality of users;
   training a predictive model using at least a portion of the historical behavior data and a neural network backward propagation technique;
   receiving real-time behavior data comprising current location data for each user of the plurality of users;
   receiving, from a service provider database, service provider utilization data identifying a target service provider;
   applying the trained predictive model to the real-time behavior data to determine one or more of a predicted response, a predicted interaction, or a predicted purchasing behavior for each of the plurality of users;
   determining one or more recommended awards at the target service provider for a subset of users among the plurality of users based on: the current location data, the service provider utilization data, and one or more of the predicted response, the predicted interaction, or the predicted purchasing behavior for each of the plurality of users;
   transmitting, via the application server to a plurality of mobile devices associated with the subset of users, a plurality of messages each comprising an offer to exchange a number of points to enter a drawing to win the one or more recommended awards at the target service provider, wherein each of the plurality of messages cause a mobile application installed on each of the plurality of mobile devices to launch and provide the offer;
   receiving one or more requests from one or more of the plurality of mobile devices to exchange the number of points to enter the drawing to win the one or more recommended awards;
   determining, based on the one or more requests, at least one winning user of the subset of users and at least one recommended award of the one or more recommended awards; and
   transmitting, to a first mobile device of the plurality of mobile devices corresponding to the at least one winning user, a confirmation of the at least one recommended award, wherein the at least one recommended award is associated with an identifier of the first mobile device, and wherein the first mobile device is used to redeem the at least one recommended award at the target service provider.

2. The method of claim 1, wherein the trained predictive model is indicative of one or more of a user's next purchase, a user's travel plans, a user's next entertainment purchase, or a user's future gaming activity.

3. The method of claim 1, wherein the subset of users are associated with a user index.

4. The method of claim 3, wherein the user index comprises data indicative of one or more of a next purchase amount, a next purchase location, a next purchase category, a travel location, a gaming type, an average wager for a given gaming type, or an entertainment type.

5. The method of claim 1, wherein the one or more recommended awards are associated with underutilized goods or services offered by the target service provider associated with the service provider utilization data.

6. The method of claim 1, wherein the historical behavior data is received from one or more of a service provider associated with the service provider database or one or more mobile devices associated with one or more users.

7. The method of claim 1, wherein the historical behavior data comprises user purchase history.

8. The method of claim 1, wherein the service provider utilization data comprises one or more of a number of available seats for an event requiring an admission ticket, a number of available tables at a restaurant, a number of excess inventory for one or more items at a retailer, one or more unoccupied gaming seats at a casino, or a number of unoccupied rooms at a hotel.

9. The method of claim 1, wherein the confirmation comprises a quick response code.

10. An apparatus comprising one or more processors and a memory storing processor executable instructions that, when executed by the one or more processors, cause the apparatus to:
receive historical behavior data associated with a plurality of users;
train a predictive model using at least a portion of the historical behavior data and a neural network backward propagation technique;
receive real-time behavior data comprising current location data for each user of the plurality of users;
receive, from a service provider database, service provider utilization data identifying a target service provider;
apply the trained predictive model to the real-time behavior data to determine one or more of a predicted response, a predicted interaction, or a predicted purchasing behavior for each of the plurality of users;
determine one or more recommended awards at the target service provider for a subset of users among the plurality of users based on: the current location data, the service provider utilization data, and one or more of: the predicted response, the predicted interaction, or the predicted purchasing behavior for each of the plurality of users;
transmit, to a plurality of mobile devices associated with the subset of users, a plurality of messages each comprising an offer to exchange a number of points to enter a drawing to win the one or more recommended awards at the target service provider, wherein each of the plurality of messages cause a mobile application installed on each of the plurality of mobile devices to launch and provide the offer;
receive one or more requests from one or more of the plurality of mobile devices to exchange the number of points to enter the drawing to win the one or more recommended awards;
determine, based on the one or more requests, at least one winning user of the subset of users and at least one recommended award of the one or more recommended awards; and
transmit, to a first mobile device of the plurality of mobile devices corresponding to the at least one winning user, a confirmation of the at least one recommended award, wherein the at least one recommended award is associated with an identifier of the first mobile device, and wherein the first mobile device is used to redeem the at least one recommended award.

11. The apparatus of claim 10, wherein the computer executable instructions further cause the apparatus to:
deduct, from one or more point balances associated with the at least one winning user, the number of points associated with the offer.

12. The apparatus of claim 10, wherein the subset of users are associated with a user index.

13. The apparatus of claim 10, wherein the trained predictive model is indicative of one or more of a user's next purchase, a user's travel plans, a user's next entertainment purchase, or a user's future gaming activity.

14. The apparatus of claim 12, wherein the user index comprises data indicative of one or more of a next purchase amount, a next purchase location, a next purchase category, a travel location, a gaming type, an average wager for a given gaming type, or an entertainment type.

15. The apparatus of claim 10, wherein the one or more recommended awards are associated with underutilized goods or services offered by the target service provider associated with the service provider utilization data.

16. The apparatus of claim 10, wherein the historical behavior data is received from one or more of a service provider associated with the service provider database or one or more mobile devices associated with one or more users.

17. The apparatus of claim 10, wherein the historical behavior data comprises user purchase history.

18. The apparatus of claim 10, wherein the service provider utilization data comprises one or more of a number of available seats for an event requiring an admission ticket, a number of available tables at a restaurant, a number of excess inventory for one or more items at a retailer, one or more unoccupied gaming seats at a casino, or a number of unoccupied rooms at a hotel.

19. The method of claim 1, wherein the location data comprises a current location and one or more previous locations for each user of the plurality of users.

20. The apparatus of claim 10, wherein the location data comprises a current location and one or more previous locations for each user of the plurality of users.

* * * * *